(12) United States Patent
Gaber

(10) Patent No.: US 8,018,124 B2
(45) Date of Patent: Sep. 13, 2011

(54) STICK-SLIP PIEZOELECTRIC MOTOR

(75) Inventor: Benny Gaber, Haifa (IL)

(73) Assignee: Pinanotech (Piezo-Nano Technology) Ltd., Tirat Carmel (IL)

(*) Notice: Subject to any disclaimer, the term of this patent is extended or adjusted under 35 U.S.C. 154(b) by 1 day.

(21) Appl. No.: 12/678,309

(22) PCT Filed: Sep. 11, 2008

(86) PCT No.: PCT/IL2008/001217
§ 371 (c)(1),
(2), (4) Date: Mar. 16, 2010

(87) PCT Pub. No.: WO2009/037693
PCT Pub. Date: Mar. 26, 2009

(65) Prior Publication Data
US 2010/0201224 A1 Aug. 12, 2010

(51) Int. Cl.
*H01L 41/08* (2006.01)
(52) U.S. Cl. ............... 310/323.06; 310/323.04; 310/369
(58) Field of Classification Search ......... 310/323.02–323.06, 366, 369
See application file for complete search history.

(56) References Cited

U.S. PATENT DOCUMENTS

| | | | | |
|---|---|---|---|---|
| 4,634,916 A * | 1/1987 | Okada et al. | ............. | 310/323.03 |
| 4,678,956 A * | 7/1987 | Izukawa et al. | .......... | 310/323.06 |
| 4,723,085 A * | 2/1988 | Mukohjima et al. | .......... | 310/328 |
| 4,893,047 A * | 1/1990 | Honda | ...................... | 310/323.02 |
| 5,148,074 A | 9/1992 | Fujita et al. | | |
| 6,051,911 A * | 4/2000 | Kojima et al. | ................ | 310/366 |

FOREIGN PATENT DOCUMENTS
| | | |
|---|---|---|
| EP | 0516175 | 12/1992 |
| JP | 05064465 | 12/1993 |

* cited by examiner

*Primary Examiner* — Mark Budd
(74) *Attorney, Agent, or Firm* — Dekel Patent Ltd.; David Klein

(57) ABSTRACT

A piezoelectric motor including a rotor, a stator including a piezoelectric material having axial polarization, the stator including at least three pairs of electrodes spaced from one another on a top end face thereof and a common electrode on a base end face thereof, and slabs affixed to the stator at spacings between the electrodes, wherein the rotor is pressed towards the slabs by a pre-load force, wherein when a positive charge is applied to a first of the electrodes and a negative charge is applied to a second of the electrodes and an electric common port is applied to the common electrode, D33 piezoelectric phenomenon is created, thereby causing the spacings between the electrodes to bend and the slabs to tilt, thus applying a frictional pushing side force against the rotor to cause the rotor to rotate.

17 Claims, 13 Drawing Sheets

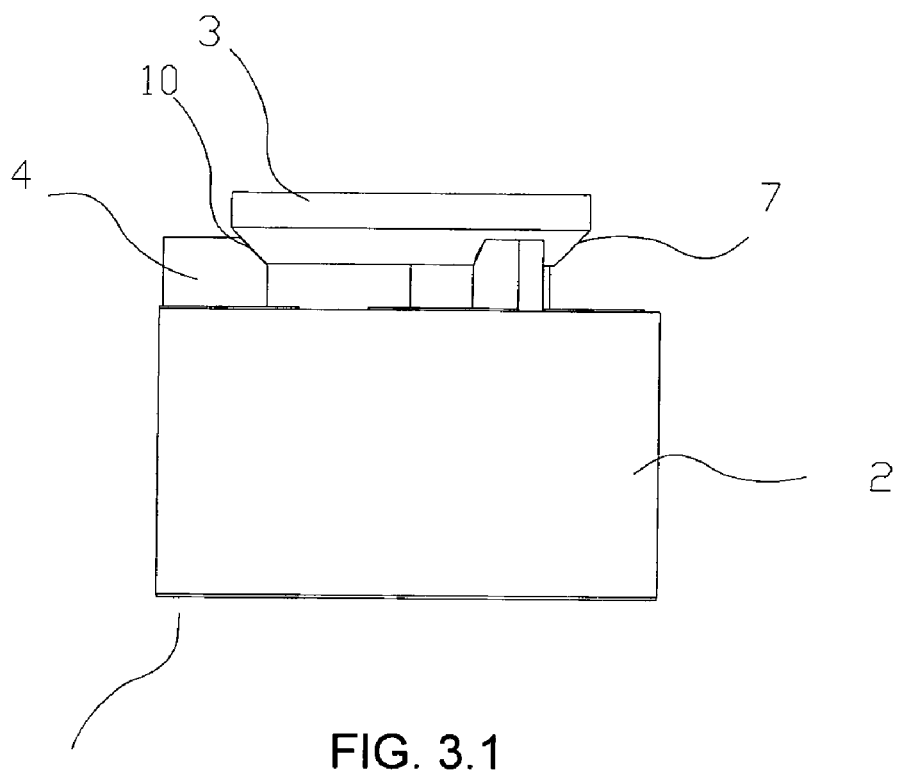
FIG. 3.1
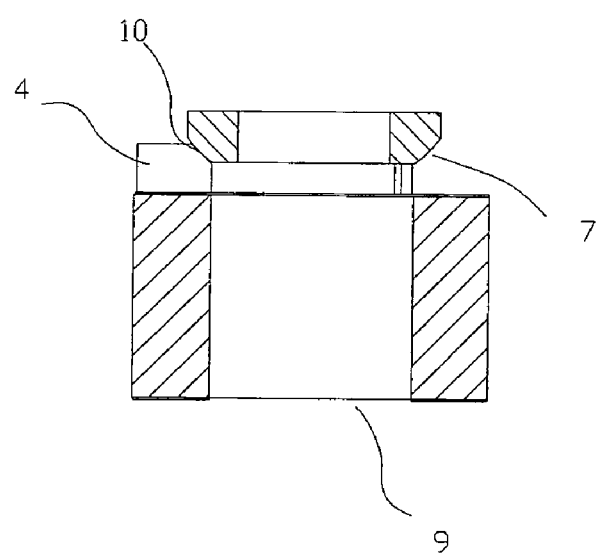
FIG. 3.2

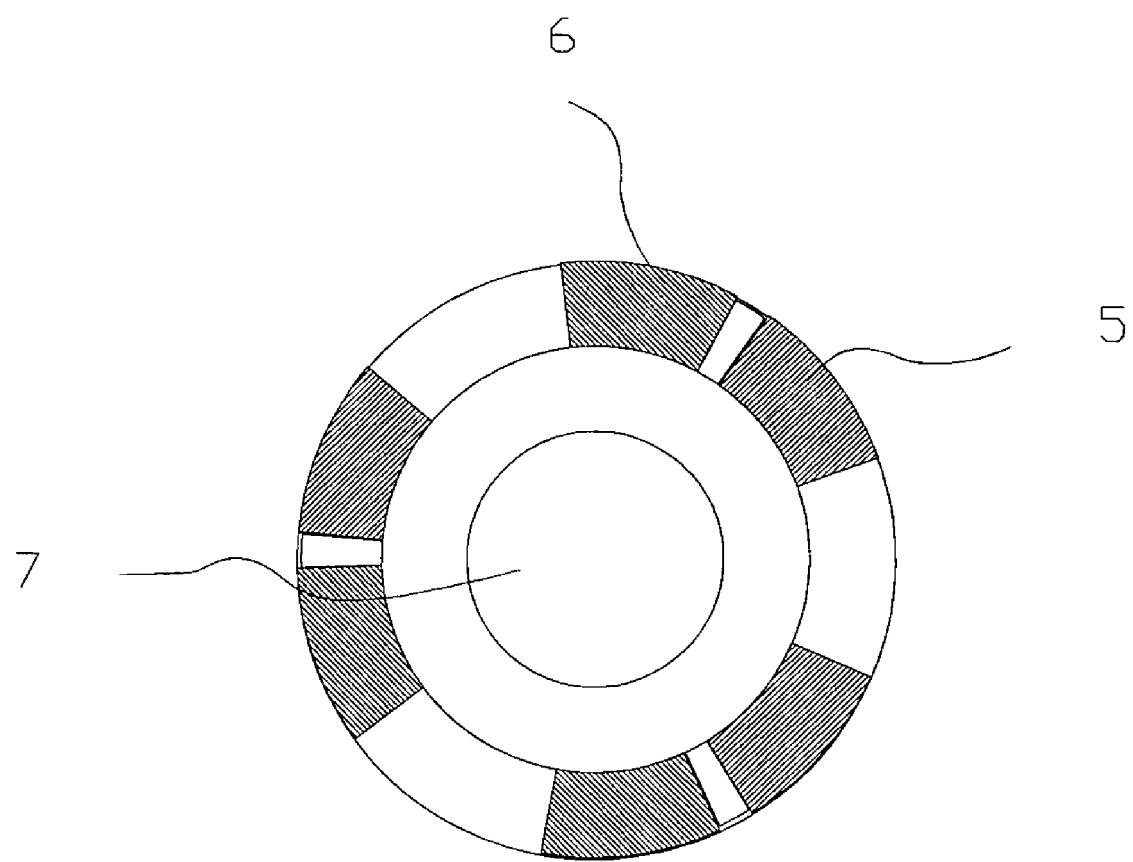
FIG. 3.3

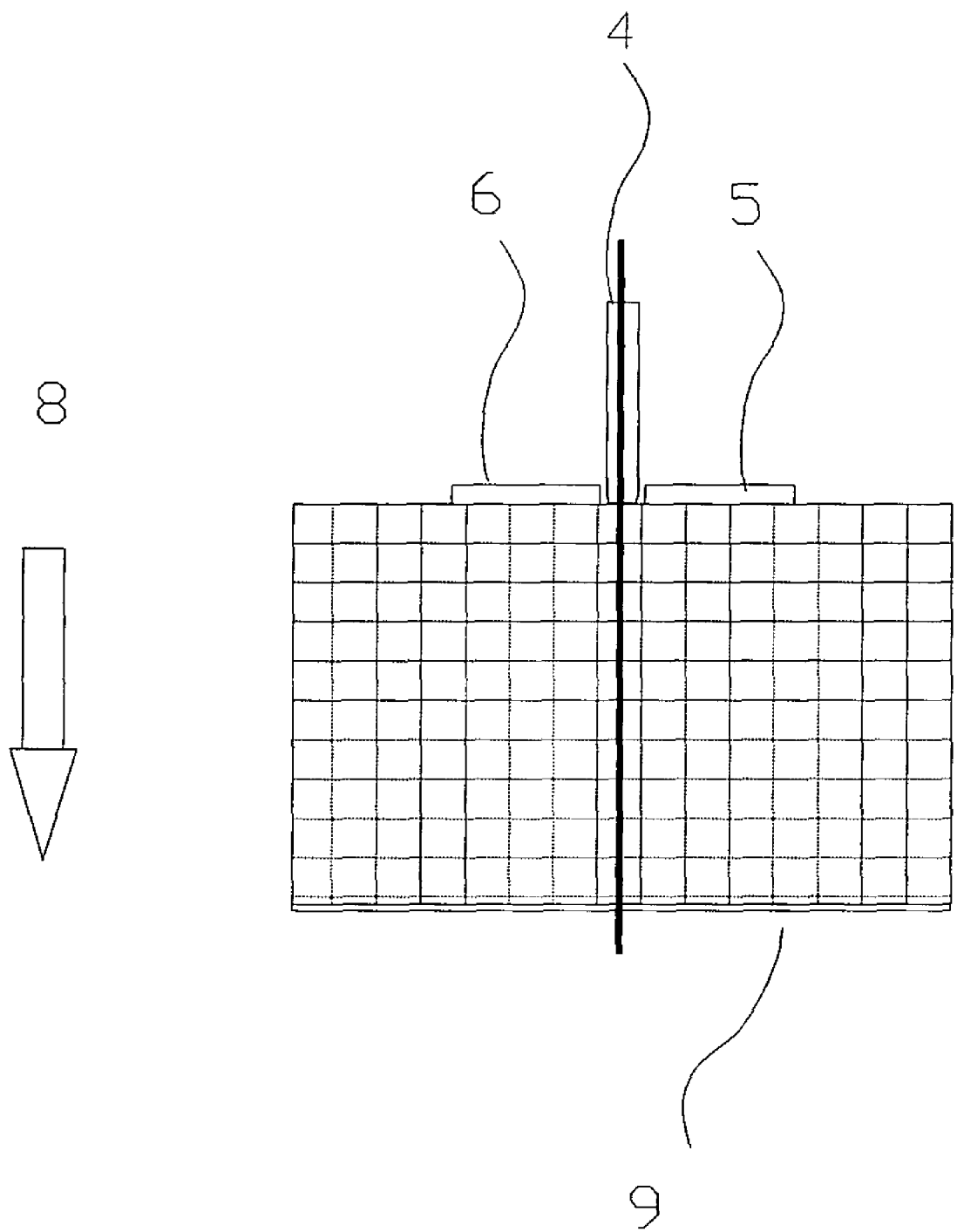
FIG. 4.1

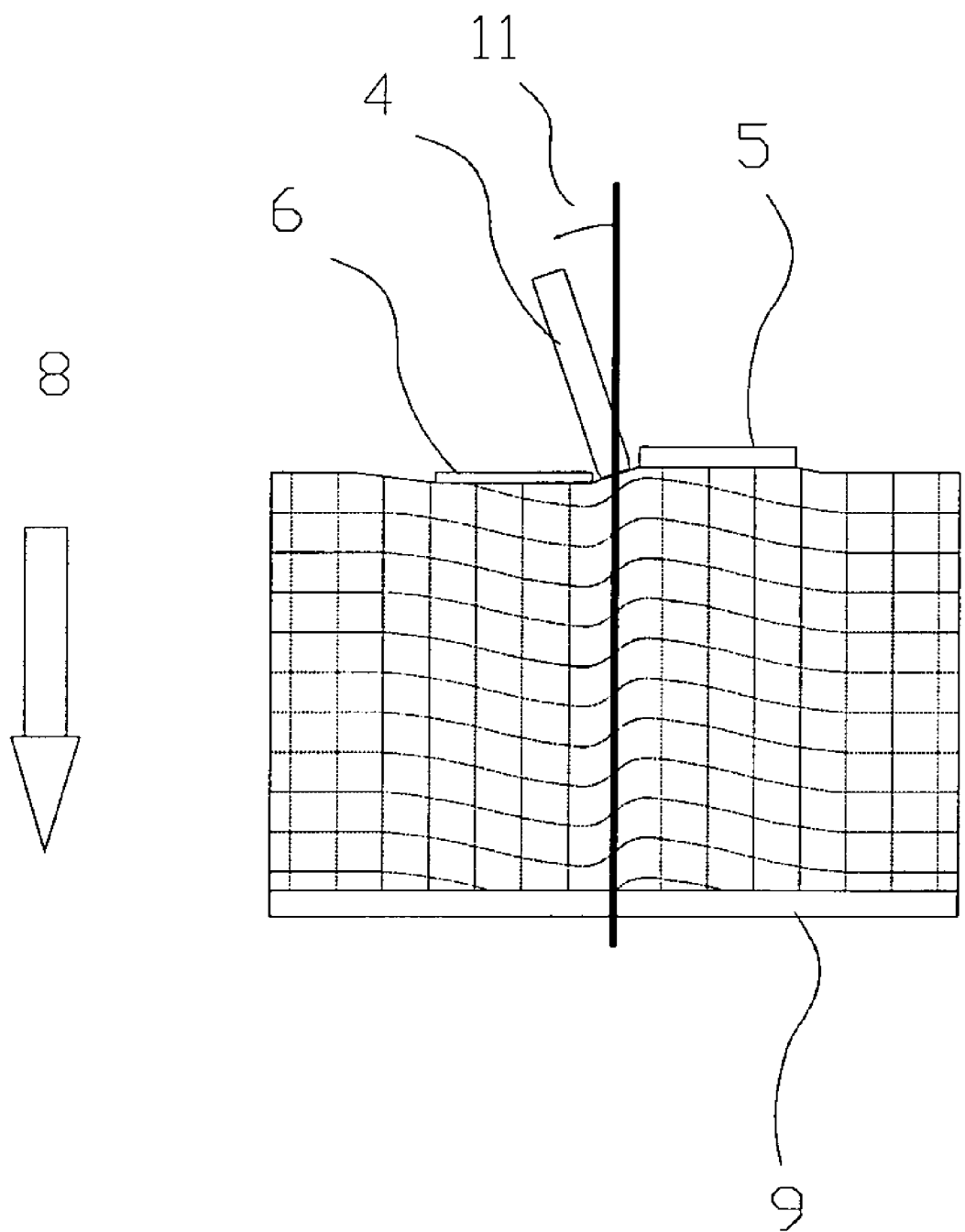
FIG. 4.2

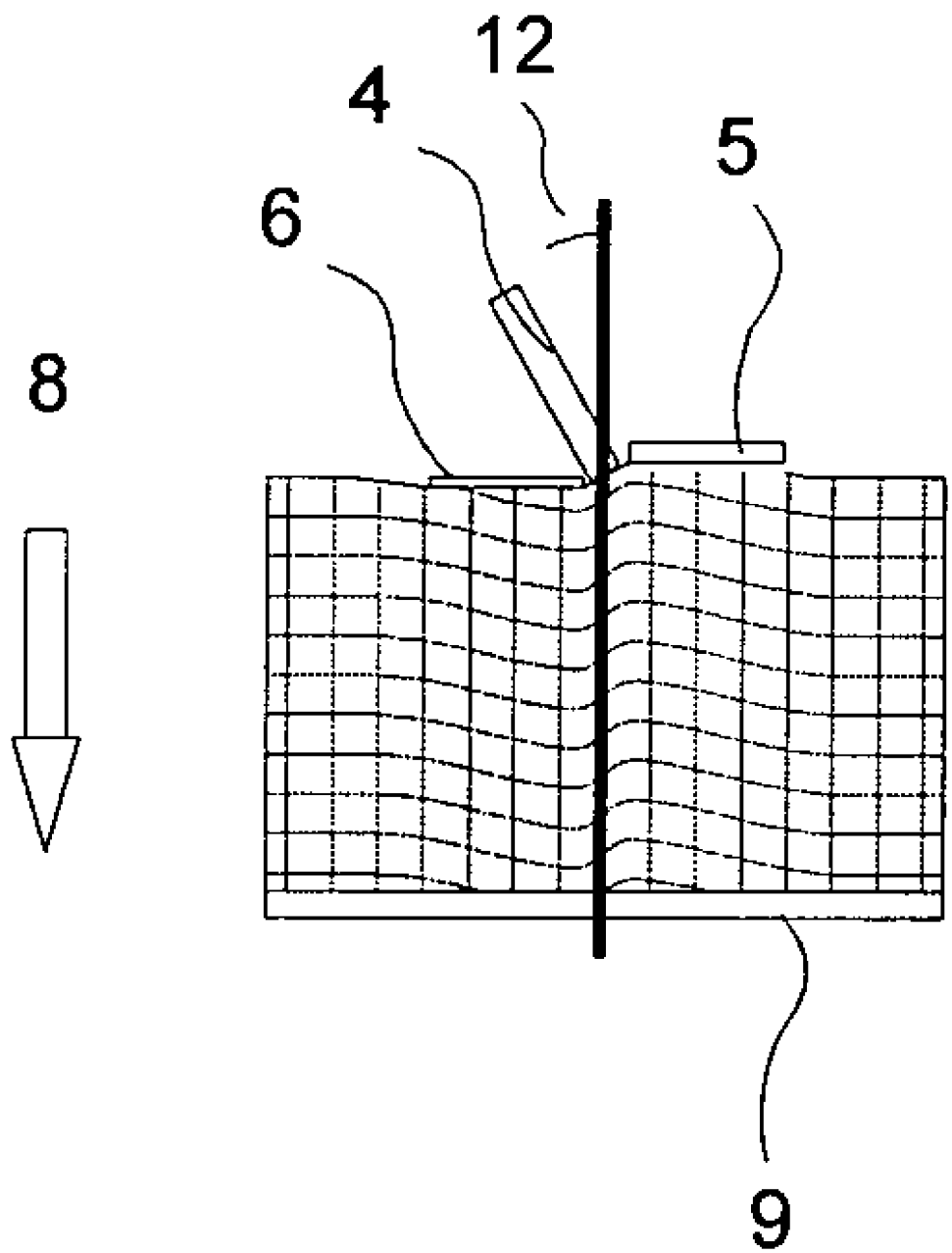
FIG. 4.3

| elect \ step | 0 | I | II | III | I |
|---|---|---|---|---|---|
| A | 0 | −.3 v | −.6 v | +.6 V | −.3V |
| B | 0 | +1v | −.3 v | 0 | +1V |

FIG. 5.1

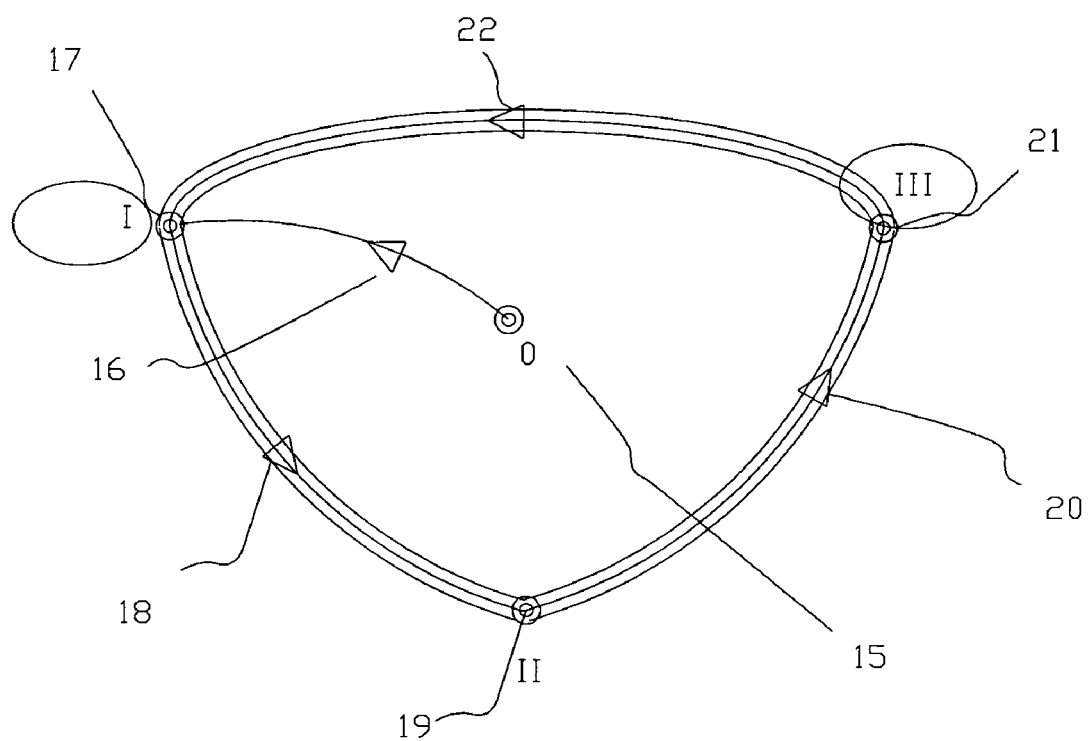
FIG. 5.2

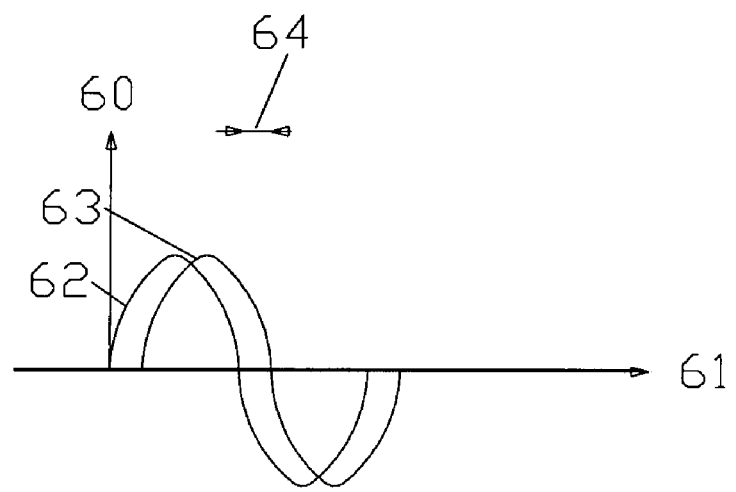
FIG. 5.3
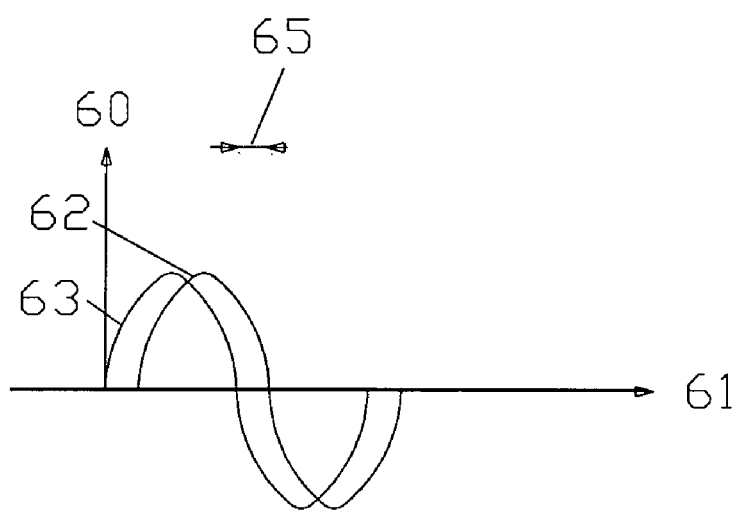
FIG. 5.4

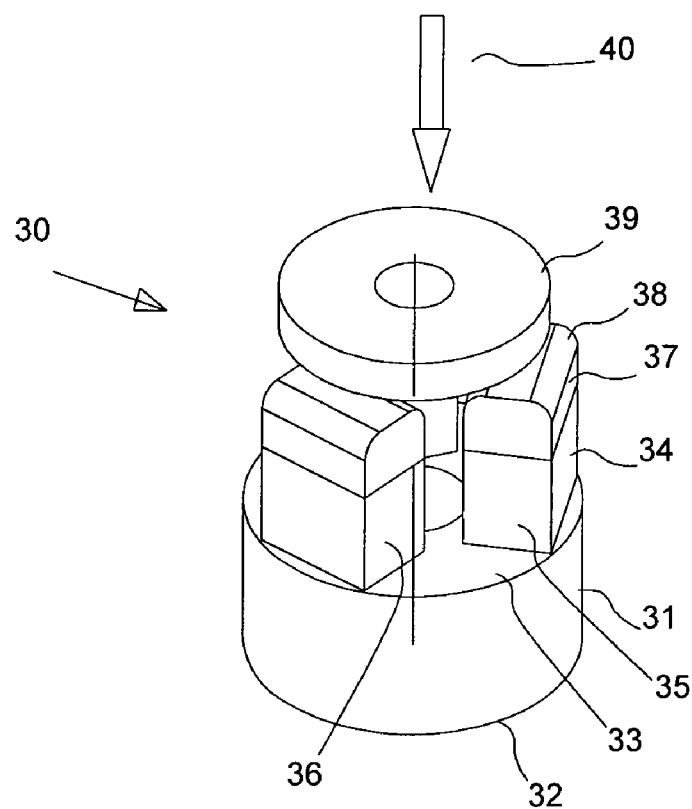
FIG. 6.1
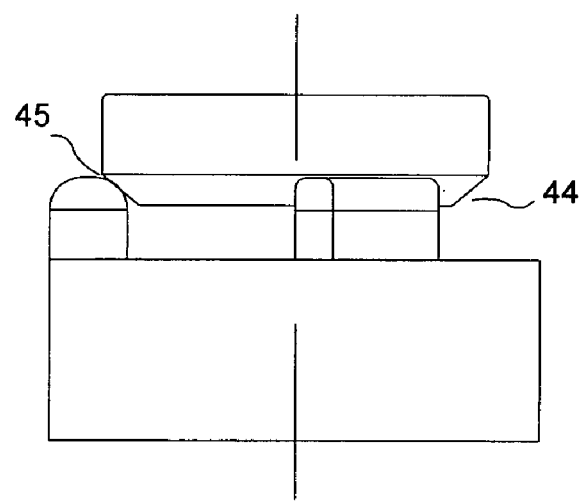
FIG. 6.2

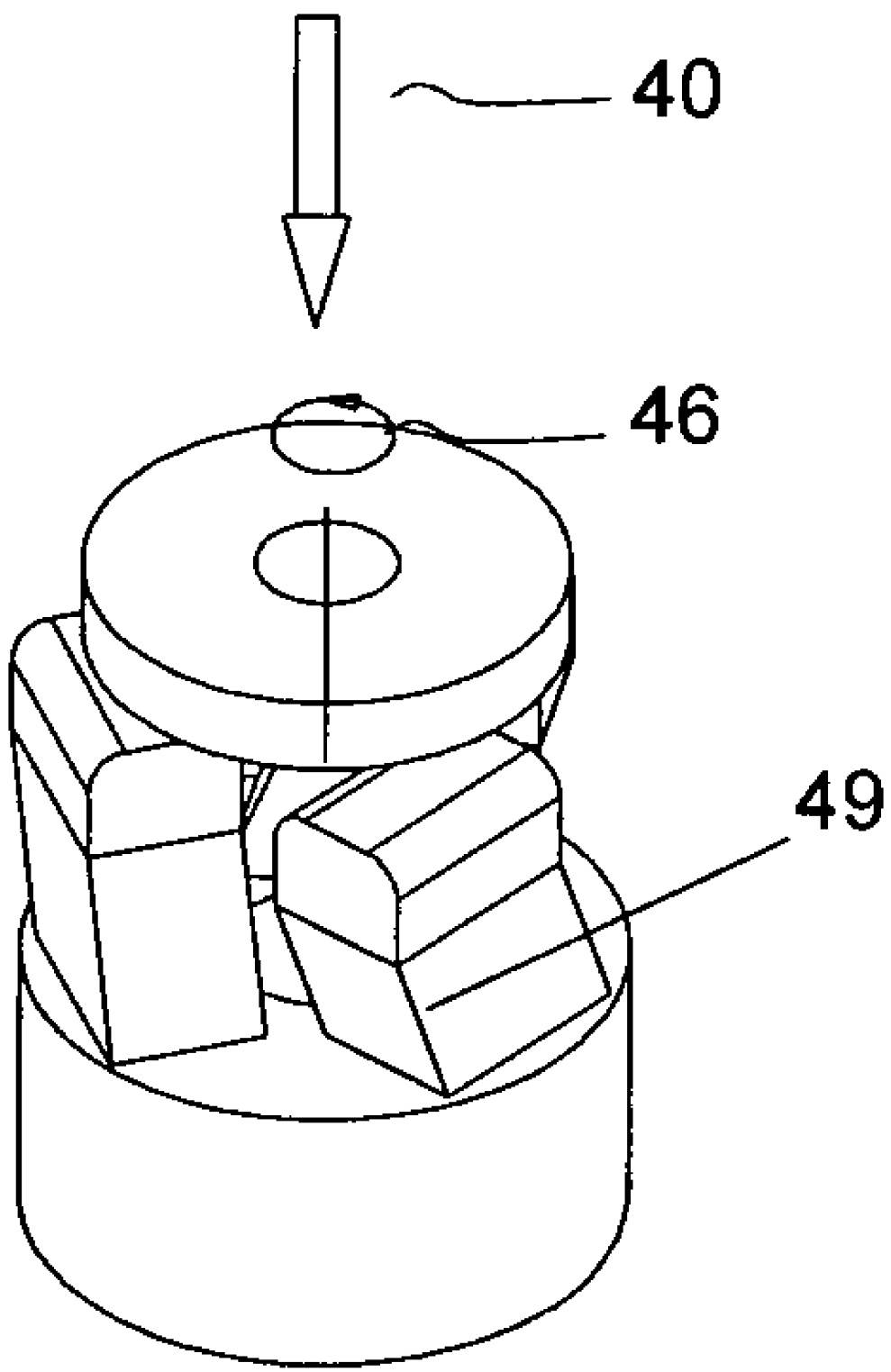
FIG. 7.1

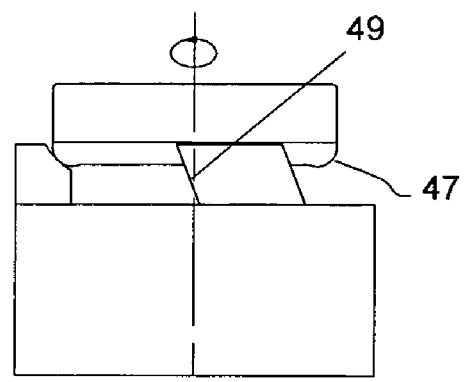
FIG. 7.2
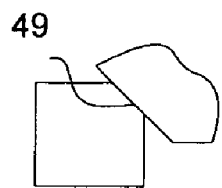 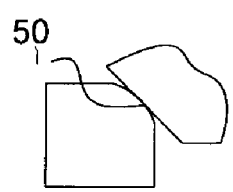 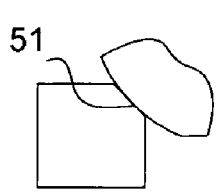 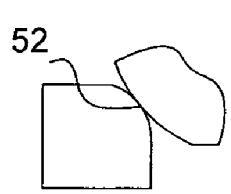
FIG. 8.1    FIG. 8.2    FIG. 8.3    FIG. 8.4

STICK-SLIP PIEZOELECTRIC MOTOR

FIELD OF THE INVENTION

The present invention relates generally to piezoelectric motors, such as a tube piezoelectric rotary-stage-less motor with a coned connection rotor.

BACKGROUND OF THE INVENTION

There are many devices based on the piezoelectric effect. These devices are widely in use in ultrasound transducers and actuators. Piezoelectric actuators or motors are also very well known for rotating a stage with "stick-slip" friction contact.

SUMMARY OF THE INVENTION

There is thus provided in accordance with an embodiment of the present invention, a piezoelectric motor including a tube rotor, a tube stator including a piezoelectric material having axial polarization, the stator including at least three pairs of electrodes spaced from one another on a top end face thereof and a common electrode on a base end face thereof, and slabs affixed to the stator at spacings between the electrodes, wherein the rotor is pressed towards the slabs by a pre-load force, wherein when a positive charge is applied to a first of the electrodes and a negative charge is applied to a second of the electrodes and an electric common port is applied to the common electrode, $D_{33}$ piezoelectric phenomenon is created which causes an area under the first of the electrodes to move in one direction with respect to the base end face and an area under the second of the electrodes to move in a direction opposite to that of the first of the electrodes, thereby causing the spacings between the electrodes to bend and the slabs to tilt, thus applying a frictional pushing side force against the rotor to cause the rotor to rotate, and wherein a voltage is greater at one of the electrodes than the other, thereby lifting and rotating the slabs as well as increasing a contact force between the slabs and the rotor.

Throughout the specification and claims, the term "tube" refers to a hollow round shaped object, such as but not limited to, a hollow disc (may be long or short in height).

In accordance with an embodiment of the present invention the rotor includes a cone shaped surface and the slabs are chamfered, wherein the pre-load force that presses the rotor towards the slabs is centered along a mutual central axial axis of the stator and the cone shaped surface of the rotor.

Further in accordance with an embodiment of the present invention the electrodes are formed by conductive coatings on the piezoelectric material.

Still further in accordance with an embodiment of the present invention a 90° shift between periodic charges applied to the electrodes causes rotation of the rotor in one direction and a 270° shift causes rotation in an opposite direction.

In accordance with an embodiment of the present invention modifying a shift between charges applied to the electrodes (or modifying a voltage applied to them) modifies rotation of the rotor. The charges applied to the electrodes may include periodic electrical signals (sine, cosine, etc.).

In accordance with an embodiment of the present invention a matching contact shape between the chamfer of the slab and the cone shape of the rotor includes at least one of a straight line, concave shape, and rounded curve.

There is also provided in accordance with an embodiment of the present invention a piezoelectric motor including a (tube) rotor, a (tube) stator including a piezoelectric material, including a base end face and top end face with axial polarization having electrodes on both end faces, a plurality of equally spaced side actuators made of piezoelectric material affixed to the top end face having parallel polarity to a central axial axis of the stator, the actuators having electrodes on their faces perpendicular to the stator polarization direction and tangent to the top end face of the stator, and tip members affixed to the side actuators, wherein the rotor is pressed towards the tip members with a pre-load force, wherein when oppositely signed electrical charges are applied to the base end face and the top end face of the stator, the top end face of the stator moves axially, and when oppositely signed electrical charges are applied to the side actuator electrodes, the piezoelectric material distorts sideways like a parallelogram due to piezoelectric transverse $D_{15}$ effect, thereby causing the tips to press against and move the rotor, thereby lifting and rotating the side actuators as well as increasing a contact force between the tip members and the rotor.

In accordance with an embodiment of the present invention the rotor includes a cone shaped surface and the tip members are chamfered, wherein the pre-load force that presses the rotor towards the tip members is centered along a mutual central axial axis of the stator and the cone shaped surface of the rotor.

Further in accordance with an embodiment of the present invention a matching contact shape between the tip members and the cone shape of the rotor includes at least one of a straight line, concave shape, and a rounded curve (other shapes are also within the scope of the invention).

The cone connection enhances the transferred friction moment from the tip to the cone by a reciprocal of the sinus of the cone angle.

When the movement of the tip is towards the rotor the contact pre-load force increases, thereby increasing the frictional force. When opposite charges are applied to the above pair electrodes, the stator will distort to the opposite side.

These movements are performed very rapidly due to the fast response time of piezocrystal and/or by operating the stator at its natural frequency so that upon the movement of the tip away from the rotor, the relatively slow, natural mechanical response time of the rotor-spring pre-load will cause the tip of the slab to come out of contact with the rotor cone. This is known as the "stick-slip" connection.

Yet another preferred embodiment of the present invention relates to a combined of piezoelectric effects (e.g., D33 and D15, defined below).

In accordance with an embodiment of the present invention the pre-load force enhances friction between the rotor and the slabs and causes a locking state of the rotor when no charge is applied to the stator.

BRIEF DESCRIPTION OF THE DRAWINGS

The disclosed technique will be understood and appreciated more fully from the following detailed description taken in conjunction with the drawings in which:

FIG. 3.1 is a side view of the piezomotor of FIG. 1.

FIG. 3.2 is a sectional view taken through the front view of the piezomotor of FIG. 1.

FIG. 3.3 is a top view of the piezomotor of FIG. 1 without the rotor.

FIG. 4.1 is a schematic side view illustration of the strain effect of the piezomotor and the slab position before applying an electric field.

FIG. 4.2 is a schematic side view illustration of the strain effect of the piezomotor and the slab position after applying an electric field.

FIG. 4.3 is a schematic side view illustration of the strain effect of the piezomotor and the slab position after applying a greater electric field.

FIG. 5.1 is a graphical example of an electrical sequence applied to the electrode that produces rectangular tip motion.

FIG. 5.2 is an illustrative example of the rectangular tip motion due to the electrical sequence applied to the electrode as in FIG. 5.1.

FIG. 5.3 is an operation mode of a positive phase lag between sine electrical signal pulses applied to the top face electrodes.

FIG. 5.4 is an operation mode of a negative phase lag between sine electrical signal pulses applied to the top face electrodes.

FIG. 6.1 is a schematic general view illustration of the combined piezomotor in its non-electrically excited position.

FIG. 6.2 is a schematic side view illustration of the combined piezomotor in its non-electrically excited position.

FIG. 7.1 is a schematic general view illustration of the combined piezomotor in its electrically excited strained position.

FIG. 7.2 is a schematic side view illustration of the combined piezomotor in its electrically excited strained position.

FIG. 8.1 is a schematic general view illustration of the contact area of the piezomotor tip with the rotor cone in which both the tip and the cone have straight contours.

FIG. 8.2 is a schematic general view illustration of the contact area of the piezomotor tip with the rotor cone in which the tip is curved and the cone has a straight contour.

FIG. 8.3 is a schematic general view illustration of the contact area of the piezomotor tip with the rotor cone in which the cone has a straight contour and the cone is curved.

FIG. 8.4 is a schematic general view illustration of the contact area of the piezomotor tip with the rotor cone in which both the tip and the cone have curved contours.

DETAILED DESCRIPTION OF EMBODIMENTS

The following is accepted nomenclature used in piezoelectricity. Reference axes in piezoelectric transducers are termed 1, 2 and 3, analogous to x, y and z axes of objects, while axes 4, 5 and 6 identify rotations. Piezoelectric transducer directions of polarization (3) are established during manufacture. Modes $D_{33}$ and $D_{31}$ are referred to as breathing modes and mode $D_{15}$ is referred to as the shearing mode. In this nomenclature, $D_{31}$ would have voltage applied in the "3" direction and resultant length changes would be measured in the "1" direction. In a $D_{33}$ actuator, voltage is again applied in the "3" direction, but the length change is measured in the "3" direction.

Figure 1:
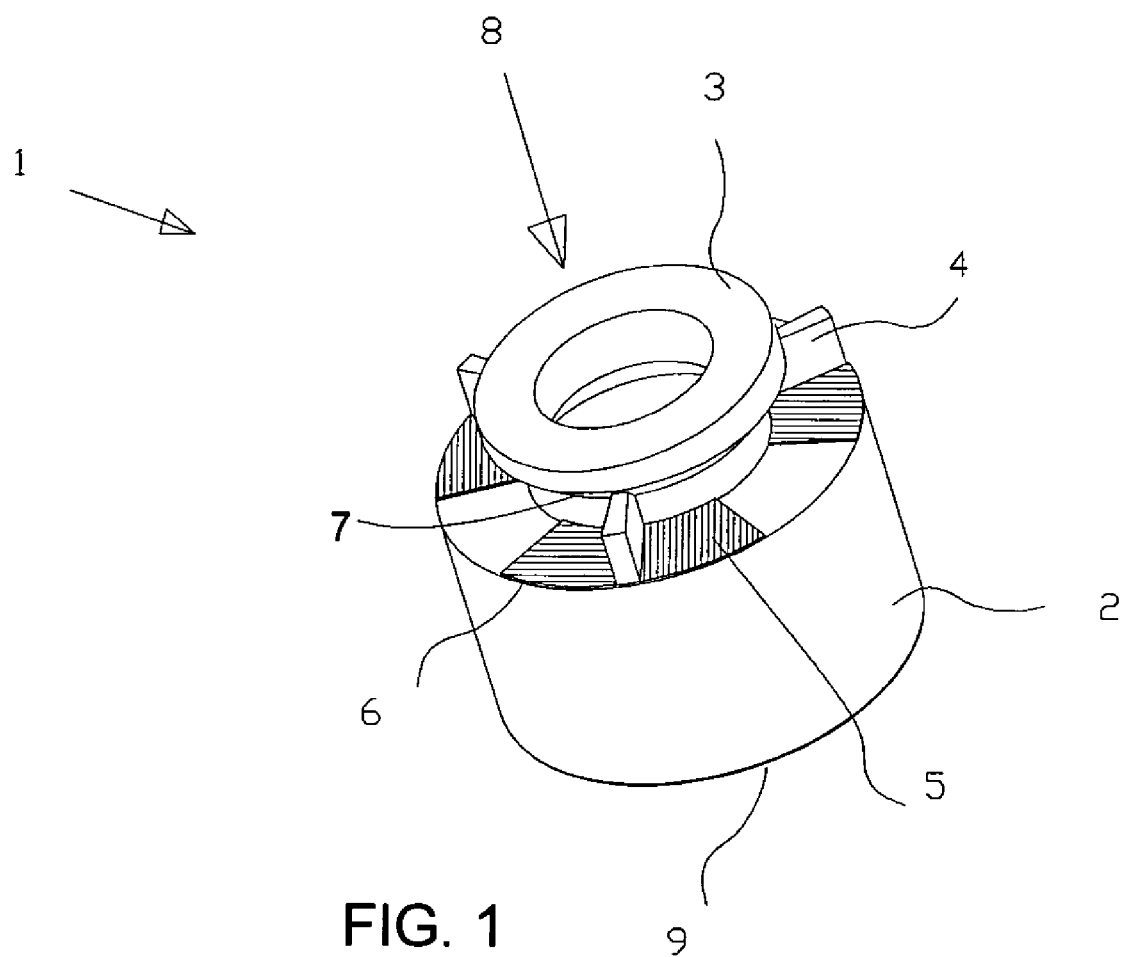
FIG. 1 is a schematic general view illustration of the piezoelectric motor (or piezomotor for short) including the stator, electrodes, slab and rotor, in accordance with an embodiment of the present invention.

Reference is now made to FIG. 1, which illustrates a piezoelectric (rotary) motor 1 (or piezomotor for short) including a stator, electrodes, slab and rotor, constructed and operative in accordance with an embodiment of the present invention. The stator 2 of the piezoelectric rotary motor 1 is made from a piezoelectric crystal material tube, coated with pairs of two separate conductive coating segmented electrodes 5 and 6 on the top end face. Slabs 4 (made of a hard material, such as ceramic) are affixed to the stator 2 at the spacings between the pairs of electrodes 5 and 6. The rotor 3 is formed with a cone shaped side 7. The rotor 3 is pressed towards the slabs 4 via a pre load force directed along the stator 2 in an axial direction 8. The piezoelectric crystal material tube of the stator 2 is polarized along the axial axis of the stator 2 in the direction indicated by arrow 8.

When a positive charge is applied to electrodes 5 and a negative charge is applied to electrodes 6, with an electric common port being applied to the base end face common electrode 9, the $D_{33}$ piezoelectric phenomenon is created, which causes the area under electrode 5 to move in one direction with respect to the base end face 9 and the area under electrode 6 to move in the other direction.

Figure 2:
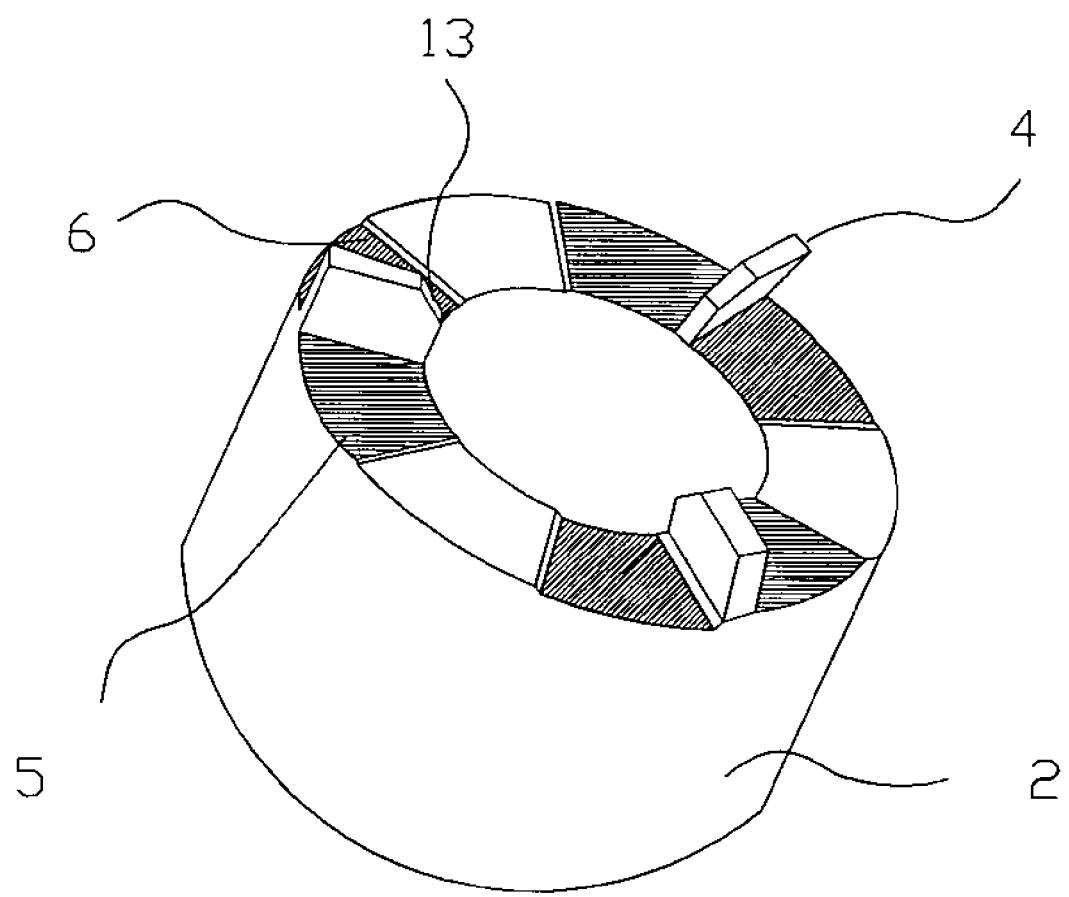
FIG. 2 is a schematic general view illustration of the piezomotor of FIG. 1 without the rotor.

Reference is now made to FIG. 2, which illustrates the tube piezoelectric rotary motor 1 of FIG. 1 without the rotor 3. It is seen that the slabs 4 have a chamfer 13 to match the contour of the rotor cone 7.

Reference is now made to FIG. 3.1, which is a side view of the piezomotor 1 in its non-electrically excited position showing the matching contact 10 between slab chamfer 13 and the rotor cone 7

Reference is now made to FIG. 3.2, which is a sectional view of the piezomotor 1 in its non-electrically excited position showing the matching contact 10 between slab chamfer 6 and the rotor cone 7.

Reference is now made to FIG. 3.3, which is a top view of the piezomotor 1 showing the arrangement of the segmented coated electrodes 5 and 6, and the slabs 4 in the spacings between the electrodes 5 and 6 and the rotor 7.

Reference is now made to FIG. 4.1, which is a schematic illustration of the strain mesh on the piezomotor stator 2 in its non-excited position. Arrow 8 indicates the polarization direction.

Reference is now made to FIG. 4.2, which is a schematic illustration of the strain mesh on the piezomotor stator 2 in its electrically excited position. A positive charge is applied to electrode 5 and a negative charge to electrode 6 and common ground is applied to common electrode 9. The area under electrode 5 moves to the opposite direction of the polarization (arrow 8) and the area under electrode 6 moves to the direction of polarization (arrow 8) due to the piezoelectric effect $D_{33}$. The spacing between the electrodes 5 and 6 is tilted, rotating with it slab 4 by an angle indicated by arrow 11.

Reference is now made to FIG. 4.3, which is a schematic illustration of the strain mesh on the piezomotor stator 2 in its electrically excited position. A greater positive charge than in FIG. 4.2 is now applied to electrode 5 and a smaller negative charge as in FIG. 4.2 is applied to electrode 6 keeping the same voltage difference as in FIG. 4.2 and a common ground is applied to common electrode 9. The area under electrode 5 moves more than in FIG. 4.2 to the opposite direction of polarization (arrow 8) and the area under electrode 6 moves less to the direction of polarization (arrow 8). The spacing between the electrodes 5 and 6 is tilted and lifted, and slab 4 is also tilted and lifted by the angle indicated by arrow 12. Thus, slab 4 is lifted and rotated, thereby increasing the contact force between slab 4 and rotor cone 7 causing the first quarter cycle of the "stick-slip" configuration.

Reference is now made to FIG. 5.1 which is one example of a charging sequence of the electrodes 5 and 6, wherein A indicates electrode 5 and B indicates electrode 6. FIG. 5.1 shows the voltage applied to the electrodes at each sequence and its sign. Starting at point 0, no voltage is applied to the electrodes, and thus no strain is created in the piezomotor. At step I, electrode 5 receives −0.3v and electrode 6 receives +1v. At step II, electrode 5 receives −0.6v and electrode 6 receives −0.3v. At step III, electrode 5 receives −0.3v and electrode 6 receives 0 volts. The above three steps are just one example of many full sequences that can be used to operate the piezomotor.

Reference is now made to FIG. 5.2, which is a schematic illustration of the slab tip movements at the contact point with the rotor cone 7, while operated in the electrical sequence of FIG. 5.1, wherein point (0) 15 is the starting point. Step I-17 is reached via the path indicated by arrow 16, step II-19 is reached via the path indicated by arrow 18, step III-21 is reached via the path indicated by arrow 20, and the cycle is completed back to point I-17 via a path indicated by arrow 22.

Energizing with opposite signs reverses the cycle direction.

The general shape achieved in this cycle is triangular. The leg from step III 21 to step I-17 via path 22 is generally parallel to the working stroke of the piezomotor and hence achieves improved efficiency.

Reference is now made to FIG. 5.3, which is a graphical illustration of an operation mode of phase lag 64 between two electrical sine signals 62 and 63, which are pulses applied to each of the top face electrodes. The ordinate (y) axis 60 is the voltage and the abscissa (x) axis 61 is the time. The phase lag 64 causes the rotor to rotate in one direction.

FIG. 5.4 is an operation mode of a negative phase lag 65 compared to the positive phase lag of FIG. 5.3. This causes the rotor to rotate in an opposite direction to the rotor rotation of FIG. 5.3.

Reference is now made to FIG. 6.1, which is a schematic general view illustration of a combined piezomotor 30, constructed and operative in accordance with an embodiment of the present invention. Piezomotor 30 is made of a piezoelectric crystal material tube 31 with axial polarization parallel to arrow 40, with a coated conducting electrode 32 on its down face and a coated conducting electrode on the top face 33. At least three piezoelectric side actuator members 34, evenly arranged, are affixed to the top face 33, and are polarized parallel to the axial axis of tube 31 along the direction indicated by arrow 40. Each of side actuator members 34 has a coated conducting electrode on sides 35 and 36. A part 37 (preferably made of a hard material) is affixed on top of the side actuator members 34, and has an interface shape 38 that matches the rotor 39 cone. Rotor 39 is pressed against the interface shape 38 by a pre-load force in a direction indicated by arrow 40.

Reference is now made to FIG. 6.2, which is a schematic side view illustration of the combined piezomotor 30 of FIG. 6.1 showing the cone 44 of the rotor 39 and the contact point 45 between the interface shape 38 and the rotor cone 44.

Reference is now made to FIG. 7.1, which is a schematic general view illustration of the combined piezomotor 30 of FIG. 6.1 in its distorted position under electrical stimulation to the electrodes. Electrodes 32 and 33 are energized with opposite sign voltages, causing the upper face under electrode 33 of tube 31 to move in a direction opposite to arrow 40, thereby lifting the three side actuator members 34 together with it. Opposite sign electrical stimulations are supplied to the electrodes 35 and 36 of the side actuator members 34, causing the upper face and the members 37 affixed to them to move sideways tangent to the tube in a direction indicated by arrow 49 due to D15 piezoelectric effect. The rotor 39 is pressed against chamfers 38 of the side actuator members 34 by a pre load in the direction indicated by arrow 40. This causes rotation in the direction of arrow 46 due to the increased normal force between the rotor cone 44 and the chamfer 38 and the sideways movement of the side actuator members 34 driven by friction between them. Reversing the electrical sequence causes the side actuator members 34 to move downwards in the direction of arrow 40 and causes the upper face to move to the opposite direction relative to the previous electrical stimulation.

It is noted that in the embodiments of the present invention, the cone contact enhances the available friction torque transmission.

Reference is now made to FIG. 7.2, which is a schematic side view illustration of the combined piezomotor 30 of FIG. 7.1 showing the cone 47 of the rotor 39 having a round shape.

Reference is now made to FIG. 8.1, which is a schematic general view illustration of the contact area of the piezomotor tip with the rotor cone in which both the tip and the cone have straight contours.

Reference is now made to FIG. 8.2, which is a schematic general view illustration of the contact area of the piezomotor tip with the rotor cone in which the tip is curved and the cone has a straight contour.

Reference is now made to FIG. 8.3, which is a schematic general view illustration of the contact area of the piezomotor tip with the rotor cone in which the cone has a straight contour and the cone is curved.

Reference is now made to FIG. 8.4, which is a schematic general view illustration of the contact area of the piezomotor tip with the rotor cone in which both the tip and the cone have curved contours.

It is appreciated that various features of the invention which are, for clarity, described in the contexts of separate embodiments, may also be provided in combination in a single embodiment. Conversely, various features of the invention which are, for brevity, described in the context of a single embodiment, may also be provided separately or in any suitable subcombination.

What is claimed is:

1. A piezoelectric motor comprising:
   a rotor;
   a tube stator comprising a piezoelectric material having axial polarization, said stator comprising at least three pairs of electrodes spaced from one another on a top end face thereof and a common electrode on a base end face thereof; and
   slabs affixed to said stator at spacings between said electrodes, wherein said rotor is pressed towards said slabs by a pre-load force;
   wherein when a positive charge is applied to a first of said electrodes and a negative charge is applied to a second of said electrodes and an electric common port is applied to said common electrode, $D_{33}$ piezoelectric phenomenon is created which causes an area under the first of said electrodes to move in one direction with respect to the base end face and an area under the second of said electrodes to move in a direction opposite to that of the first of said electrodes, thereby causing the spacings between the electrodes to bend and said slabs to tilt, thus applying a frictional pushing side force against said rotor to cause said rotor to rotate, and wherein a voltage is greater at one of the electrodes than the other, thereby lifting and rotating said slabs as well as increasing a contact force between said slabs and said rotor.

2. The piezoelectric motor according to claim 1, wherein said rotor comprises a cone shaped surface and said slabs are chamfered, wherein said pre-load force that presses said rotor towards said slabs is centered along a mutual central axial axis of said stator and said cone shaped surface of said rotor.

3. The piezoelectric motor according to claim 1, wherein said electrodes are formed by conductive coatings on said piezoelectric material.

4. The piezoelectric motor according to claim 1, wherein a periodic electrical cycle activates said electrodes, wherein a 90° shift between charges applied to the electrodes causes rotation of said rotor in one direction and a 270° shift causes rotation in an opposite direction.

5. The piezoelectric motor according to claim 1, wherein modifying a shift between charges applied to the electrodes modifies rotation of said rotor.

6. The piezoelectric motor according to claim 1, wherein modifying voltage applied to the electrodes modifies rotation of said rotor.

7. The piezoelectric motor according to claim 2, wherein a matching contact shape between the chamfer of the slab and the cone shape of the rotor comprises at least one of a straight line, concave shape, and rounded curve.

8. A piezoelectric motor comprising:
 a rotor;
 a tube stator comprising a piezoelectric material, comprising a base end face and top end face with axial polarization having electrodes on both end faces;
 a plurality of equally spaced side actuators made of piezoelectric material affixed to said top end face having parallel polarity to a central axial axis of said stator, said actuators having electrodes on their faces perpendicular to the stator polarization direction and tangent to the top end face of said stator;
 tip members affixed to said side actuators, wherein said rotor is pressed towards said tip members with a pre-load force;
 wherein when oppositely signed electrical charges are applied to the base end face and the top end face of said stator, the top end face of said stator moves axially, and when oppositely signed electrical charges are applied to the side actuator electrodes, said piezoelectric material distorts sideways like a parallelogram due to piezoelectric transverse $D_{15}$ effect, thereby causing said tips to press against and rotate said rotor.

9. The piezoelectric motor according to claim 8, wherein said rotor comprises a cone shaped surface and said tip members are chamfered, wherein said pre-load force that presses said rotor towards said tip members is centered along a mutual central axial axis of said stator and said cone shaped surface of said rotor, wherein the charges applied to the base and top end faces of the stator are synchronized with the charges applied to the side actuator electrodes.

10. The piezoelectric motor according to claim 8, wherein said electrodes are formed by conductive coatings on said piezoelectric material.

11. The piezoelectric motor according to claim 8, wherein a periodic electrical cycle activates said electrodes, wherein a 90° shift between charges applied to the electrodes causes rotation of said rotor in one direction and a 270° shift causes rotation in an opposite direction.

12. The piezoelectric motor according to claim 1, wherein modifying a shift between charges applied to the electrodes modifies rotation of said rotor.

13. The piezoelectric motor according to claim 1, wherein charges applied to the electrodes comprise periodic electrical signals.

14. The piezoelectric motor according to claim 9, wherein a matching contact shape between said tip members and the cone shape of said rotor comprises at least one of triangular, elliptical, and rectangular shapes.

15. The piezoelectric motor according to claim 2, wherein friction between said rotor and said slabs is a function of a reciprocal of a sinus of a cone angle of said cone shaped surface.

16. The piezoelectric motor according to claim 1, wherein the pre-load force enhances friction between said rotor and said slabs and causes a locking state of the rotor when no charge is applied to the stator.

17. The piezoelectric motor according to claim 8, wherein the pre-load force enhances friction between said rotor and said slabs and causes a locking state of the rotor when no charge is applied to the stator.

\* \* \* \* \*